US011048958B1

(12) United States Patent
Qian et al.

(10) Patent No.: US 11,048,958 B1
(45) Date of Patent: Jun. 29, 2021

(54) OBJECT DETECTION IMPROVEMENT USING A FOREGROUND OCCUPANCY MAP

(71) Applicant: ObjectVideo Labs, LLC, Tysons, VA (US)

(72) Inventors: Gang Qian, McLean, VA (US); Sung Chun Lee, Tysons, VA (US); Sima Taheri, Tysons, VA (US); Sravanthi Bondugula, Tysons, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 121 days.

(21) Appl. No.: 16/432,395

(22) Filed: Jun. 5, 2019

Related U.S. Application Data

(60) Provisional application No. 62/685,379, filed on Jun. 15, 2018.

(51) Int. Cl.
*G06K 9/32* (2006.01)
*G06K 9/00* (2006.01)
*G06K 9/62* (2006.01)

(52) U.S. Cl.
CPC ....... *G06K 9/3233* (2013.01); *G06K 9/00771* (2013.01); *G06K 9/00825* (2013.01); *G06K 9/6256* (2013.01)

(58) Field of Classification Search
None
See application file for complete search history.

(56) References Cited

U.S. PATENT DOCUMENTS

| 10,636,173 | B1* | 4/2020 | Beach | H04N 5/247 |
|---|---|---|---|---|
| 10,657,364 | B2* | 5/2020 | El-Khamy | G06K 9/6277 |
| 10,671,919 | B2* | 6/2020 | Xiao | G06K 9/6202 |
| 2011/0051999 | A1* | 3/2011 | Tu | G06K 9/6256 |
| | | | | 382/103 |
| 2014/0079314 | A1* | 3/2014 | Yakubovich | G06K 9/6227 |
| | | | | 382/159 |

* cited by examiner

*Primary Examiner* — Leon Viet Q Nguyen
(74) *Attorney, Agent, or Firm* — Fish & Richardson P.C.

(57) ABSTRACT

Methods, systems, and apparatus, including computer programs encoded on a computer storage medium, for obtaining a foreground occupancy map for a camera view. The methods, systems, and apparatus include actions of determining an area of an image in which there is a false detection of an object, determining a likely contribution of the area to the false detection based on the foreground occupancy map, generating a modified object detector based on the likely contribution of the area, and detecting an object using the modified object detector.

20 Claims, 2 Drawing Sheets

OBJECT DETECTION IMPROVEMENT USING A FOREGROUND OCCUPANCY MAP

CROSS REFERENCE TO RELATED APPLICATIONS

This application claims benefit of U.S. Provisional Application No. 62/685,379, filed on Jun. 15, 2018, titled "OBJECT DETECTION IMPROVEMENT USING A FOREGROUND OCCUPANCY MAP," which is incorporated by reference in its entirety.

TECHNICAL FIELD

This disclosure application relates generally to monitoring systems, and more particularly, to detecting objects.

SUMMARY

Techniques are described for training an object detector. Deep object detectors may be used for video surveillance applications to detect objects. A deep object detector may refer to an object detector that is trained using deep learning. An object detector may be trained using deep learning through the use of annotated images. A training set of images may be used, where images with objects that the object detector is to be trained to detect are annotated with bounding boxes around the objects. Objects to be detected by an object detector may also be referred to as target objects. From the training set of images, the object detector may then learn to automatically detect and output bounding boxes around target objects in various images.

Bounding boxes for a training set may be manually created by people. For example, a person may see a vehicle in a first image and draw a rectangular bounding box around the vehicle in the first image, and the person may not see a vehicle in a second image so not draw any bounding box in the second image. Bounding boxes obtained through a manual annotation process by people may be referred to as ground-truth bounding boxes as the bounding boxes may be assumed to be completely accurate so that no bounding box is drawn around an area that does not include an object to be detected and a bounding box is drawn around any object to be detected that does appear in an image.

However, in real-life scenarios, contours of objects are rarely rectangle. In addition, sometimes part of an object is occluded by other objects. Therefore, it may be common for a bounding box to also include visual content other than a target object. For example, a tree branch between a camera and a vehicle may occlude part of a vehicle in an image captured by the camera so a bounding box drawn around the vehicle may also include the tree branch. Such visual content leaking from the background inside a bounding box may be confusing to the training process, and may hurt the detection performance and lead to false detections. Background may refer to visual content in an image other than a target object. For example, an object detector that is trained with many images where tree branches occlude vehicles and are in bounding boxes around the vehicles may learn to detect tree branches as vehicles. This problem of extra visual content in bounding boxes other than a target object to be detected leading to worse detection performance may be referred to as the background visual content leaking (BVCL) problem.

To address the BVCL problem, a training process may evaluate the impact of BVCL on a current object detector and then correct the object detector accordingly. Evaluating the impact of BVCL may take advantage of a unique feature of a training image dataset formed by images from surveillance video clips in that strong spatial correlation may exist among images captured by the same camera. Most surveillance cameras are stationary and the images captured by the same surveillance camera usually depict the same scene. Accordingly, for a given camera view, there are also certain image regions that are often occupied by target objects depending on the scene setting and the camera view point. BVCL in these frequently occupied areas may be highly likely to affect the training. On the other hand, there are also other images from the same camera where there is no target object present in these areas and importantly, these images may be used as probes to evaluate the impact of BVCL on the current object detector. A false detection, which may refer to background detected as target objects, in the image regions that are often occupied by target objects may be a strong indicator that the object detector is learning the background visual content as the target objects and thus needs to be corrected.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference numbers and designations in the various drawings indicate like elements

DETAILED DESCRIPTION

Techniques are described for training an object detector.

Figure 1:
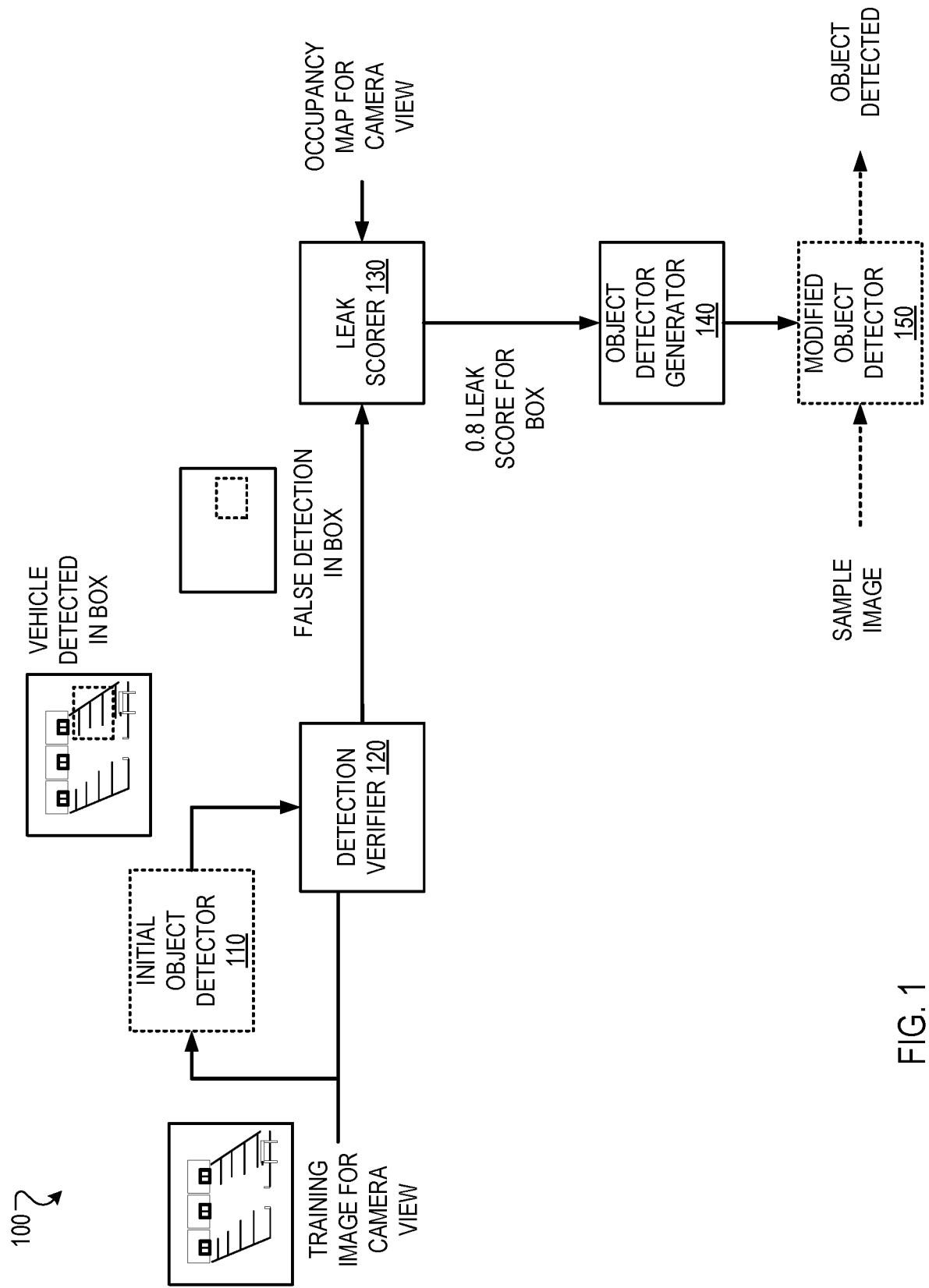
FIG. 1 illustrates an example block diagram of a system for training an object detector.

FIG. 1 illustrates an example block diagram of a system 100 for training an object detector. The system 100 includes a detection verifier 120 that detects false detections made by an initial object detector 110, a leak scorer 130 that determines likely contributions of areas of images to false detections, and an object detector generator 140 that generates a modified object detector based on the likely contributions of areas of images to false detections. The modified object detector 150 that is produced by the system 100 may more accurately detect target objects than the initial object detector 110 as the modified object detector 150 may be less prone to detect background as a target object. A more accurate object detector may result in less processing, bandwidth usage, and power usage used on false detections.

In more detail, the initial object detector 110 may obtain and process a training image for a camera view and indicate whether a target object is detected within the training image. For example, an initial object detector that is trained to detect vehicles may obtain a training image that is a view of a parking lot and draw a bounding box around a vehicle in the image. In another example, an initial object detector that is trained to detect vehicles may obtain a training image that is a view of a parking lot and draw a bounding box around an area that is falsely detected by the initial object detector 110 as including a vehicle.

As the initial object detector 110 may be trained with many images that include bounding boxes around target objects that also include portions of images other than the target objects, the initial object detector 110 may falsely detect a target object from portions of images that don't belong to a target object but are frequently included in bounding boxes of target objects in the training images. For example, an initial object detector may be trained with many images that include bounding boxes around vehicles that also include a particular portion of a parking lot and, as a result, the initial object detector 110 may falsely detect a vehicle around the particular portion of the parking lot and draw a bounding box around the particular portion of the parking lot shown in the image. In another example, an initial object detector may be trained with many images that include bounding boxes around people crossing a cross-walk and learn to recognize any object near a cross-walk as a person.

The detection verifier 120 may verify whether the initial object detector 110 made a false detection and indicate whether a false detection was made. For example, the detection verifier 120 may determine that the initial object detector 110 falsely detected a target object in an image and output an indication of "False detection." In another example, the detection verifier 120 may determine that the initial object detector 110 correctly detected a target object in an image and output an indication of "True detection."

The detection verifier 120 may verify whether the detection by the initial object detector 110 was false or correct based on the training image. For example, the detection verifier 120 may receive the training image provided to the initial object detector 110 along with metadata that indicates whether the training image included a target object, e.g., metadata that specifies a location and dimensions of a ground-truth bounding box. In the example, the detection verifier 120 may verify a detection made by the initial object detector as a false detection when the metadata of the training image does not indicate a bounding box in the training image similar in location and size to the target bounding box returned by the initial object detection and may verify a detection made by the initial object detector as a true detection when the metadata of the training image does indicate a bounding box in the training image similar in location and size to the target bounding box returned by the initial object detection.

The leak scorer 130 may obtain a target bounding box returned by the initial object detector 110 for an object detection that the detection verifier 120 has verified as false, obtain an occupancy map and, in response, generate a leak score that indicates a likely contribution of the background area visual content of the image within the bounding box to the false detection. For example, the leak scorer 130 may obtain an indication that a bounding box located at particular coordinates within the training image corresponds to a false detection, obtain a foreground occupancy map that indicates that the area within the bounding box is frequently occupied by a target object and, in response, generate a leak score of 0.8 that indicates a high likely contribution of the area of the image within the bounding box to the false detection.

The occupancy map may be a map that indicates a frequency that each pixel for images with a particular camera view is occupied by a target object. The occupancy map may be a grid or matrix that has similar dimensions to the pixel dimensions of images provided to the initial object detector 110, where values in the occupancy map indicate a frequency that each pixel appeared in a bounding box in the training images. For example, if for one thousand training images the bottom right most pixel is included one hundred bounding boxes, the bottom right most value in the occupancy may be set to 0.1, 10%, or some other value that reflects one hundred out of one thousand images included the bottom right most pixel in a bounding box. In another example, if for one thousand training images the bottom left most pixel is included two hundred bounding boxes, the bottom left most value in the occupancy may be set to 0.2, 20%, or some other value that reflects two hundred out of one thousand images included the bottom left most pixel in a bounding box.

In some implementations the occupancy map may be normalized so that the values that indicate occupancy range between two values, e.g., normalized between zero and one where one corresponds to one or more pixels that most frequently appeared in bounding boxes and zero corresponds to one or more pixels that appeared least frequently in bounding boxes.

The leak scorer 130 may generate the leak score for a bounding box of a false detection based on various different ways using the occupancy map. In some implementations, the leak scorer 130 may determine the leak score based on taking the average of the values from the occupancy map that correspond to each pixel within the bounding box. In some implementations, the leak scorer 130 may determine the leak score based on a weighted mean of the values from the occupancy map that correspond to each pixel within the bounding box, where the weights are computed based on a Gaussian kernel function. In some implementations, the leak score may range between a value of zero to one, which may involve normalization of the averaged values, where zero indicates a low likelihood that the area within the bounding box led to a false detection and one indicates a high likelihood that the area within the bounding box led to a true detection.

The object detector generator 140 may receive the leak score from the leak scorer 130, receive the training image with the bounding box that corresponds to a false detection, and generate the modified object detector 150. For example, the object detector generator 140 may receive each image from the training data set used to train the initial object detector 110 in which the detection verifier 120 determined a target object was falsely detected by the initial object detector 110 and a corresponding leak score and, in response, generate the modified object detector 150.

The object detector generator 140 may perform neural network correction by increasing an associated loss component in the network loss computation in response to a bounding box b for a false detection, which may also be referred to as a false detection box. The computation may be in the form of $L_{fd}(b) = \lambda_{fd} f(\kappa_b) g(C_b, O_b)$, where $L_{fd}(b)$ is the loss component due to the false detection, $\lambda_{fd}$ a predefined false detection weight, $\kappa_b$ the leak score for this false detection box, and $f(\kappa_b)$ is a function to compute an additional leak weight based on the leak score. For example, a form of the function may be $f(\kappa_b) = (1 + \kappa_b)$.

In this formula, $C_b$ is computed by the current network model, e.g., the current object detector, and estimates the objectness of the detection and $g(C_b, O_b)$ is the function to compute the difference between the estimated objectness $C_b$, which may represent how likely there's an object and the true objectness $O_b$, which may be zero in all false detections. This formulation of false detection loss may allow the leak score to control the amount of false detection loss value based on the leak score. When the network model is affected by BVCL, the leak scores will be high, leading to large false detection loss terms and the network model will then be properly adjusted and corrected through a backpropagation procedure.

While a bounding box is generally described as rectangular in various examples, a bounding box that is non-rectangular may additionally or alternatively be used. For example, the bounding box may be an oval, a hexagon, or some other shape and not exactly trace a shape of a target object. While various examples describe a target object as a vehicle, other examples of target objects may include humans, pets, and other types of objects.

Figure 2:
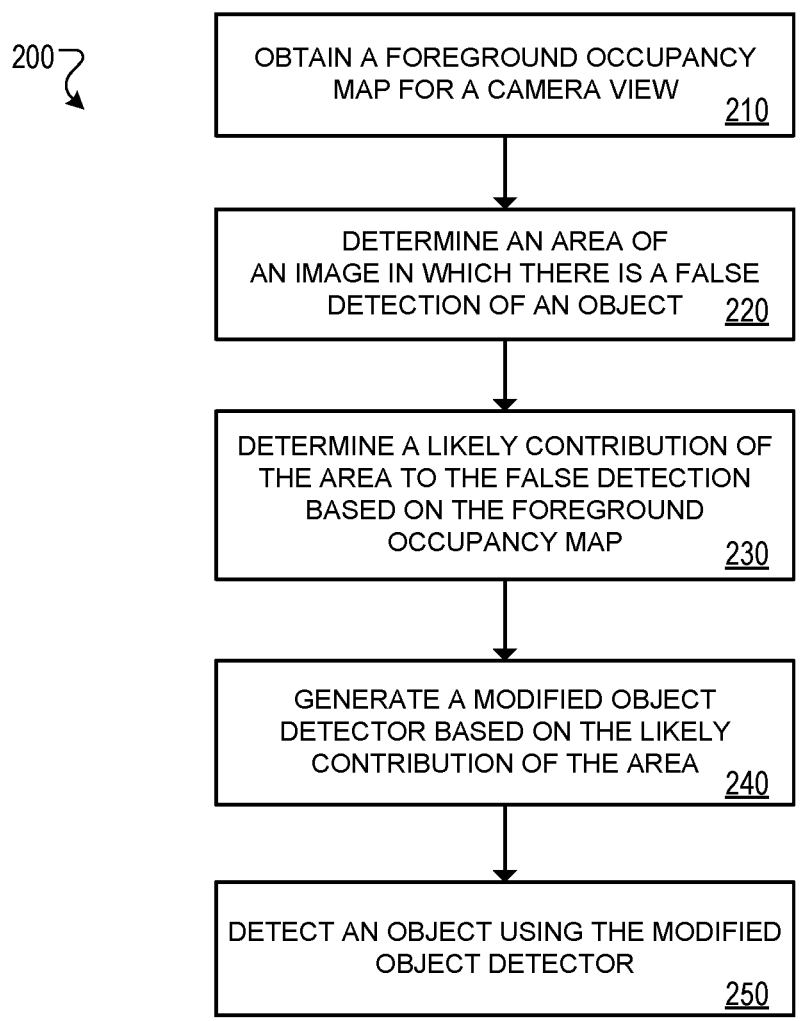
FIG. 2 is a flow diagram of an example process for training an object detector.

FIG. 2 is a flow diagram of an example process 200 for training an object detector. Process 200 can be implemented using system 100 described above. Thus, descriptions of process 200 may reference one or more of the above-mentioned components, modules, or computational devices of system 100. In some implementations, described actions of process 200 are enabled by computing logic or software instructions executable by a processor and memory of an example electronic device.

The process 200 includes obtaining a foreground occupancy map for a camera view (210). For example, the leak scorer 130 may obtain a foreground occupancy map for a view of a particular camera at a particular angle. In some implementations, obtaining a foreground occupancy map for a camera view includes determining a frequency that pixels within images from the camera view are included in a bounding box for images in a training dataset.

For example, a foreground occupancy map generator (not shown) of the system 100 may obtain the one thousand images included in the training dataset, determine that for the one thousand training images the bottom right most pixel is included one hundred bounding boxes, and, in response, in the foreground occupancy map set the bottom right most value in the occupancy may be set to 0.1, 10%, or some other value that reflects one hundred out of one thousand images included the bottom right most pixel in a bounding box. The foreground occupancy map generator may do the same for the other pixels in the foreground occupancy map and then provide the foreground occupancy map to the leak scorer 130.

In some implementations, each of the images in the training dataset includes a respective bounding box. For example, each of one thousand images in a training dataset may include one or more bounding boxes. In some implementations, the bounding box indicates that at least some pixels within the bounding box show an object of interest. For example, each bounding box of an image may indicate that an object of interest is shown by pixels within the bounding box.

The process 200 includes determining an area of an image in which there is a false detection of an object (220). For example, the detection verifier 120 may determine that an area in an image enclosed by a bounding box for a detection of a vehicle corresponds to a false detection of a vehicle. In some implementations, determining an area of an image in which there is a false detection of an object includes determining that a bounding box generated for the image does not include an object of interest. For example, the detection verifier 120 may determine that the bounding box generated by the initial object detector 110 for a training image does not match any ground-truth bounding box indicated by metadata of the training image.

In some implementations, determining that a bounding box generated for the image does not include an object of interest includes providing the image to an object detector generated from images in a training dataset and receiving, from the object detector, an indication of the bounding box. For example, a training image of the training dataset may be provided to the initial object detector 110 trained based on all the images in the training dataset, the initial object detector 110 may output an indication of a bounding box around a particular set of pixels in the training image, and that indication may then be provided to the detection verifier 120 for verification.

The process includes determining a likely contribution of the area to the false detection based on the foreground occupancy map (230). For example, the leak scorer 130 may determine a leak score of 0.5 for a particular false detection box based on averaging a value in the foreground occupancy map for each pixel within the false detection box.

In some implementations, determining a likely contribution of the area to the false detection based on the foreground occupancy map includes determining values for pixels in the foreground occupancy map for the camera view that correspond to pixels in the bounding box and determining the likely contribution of the area to the false detection based on the values for the pixels in the foreground occupancy map. For example, for an image with a false detection, the leak scorer 130 may identify the values for each pixel in the foreground occupancy map for each pixel that is in a same location as a pixel in the bounding box, and then determine a weighted average from the values identified.

The process includes generating a modified object detector based on the likely contribution of the area (240). For example, the object detector generator 140 may obtain leak scores for all the false detection boxes from providing the initial object detector 110 each of the images in the training dataset used to train the initial object detector 110, in response, increase a loss component function for each of the false bounding boxes in relation to the leak score for the false bounding box, and generate the modified object detector 150.

In some implementations, generating a modified object detector based on the likely contribution of the area includes increasing a loss component for the bounding box based on the likely contribution of the area and training a modified object detector based on the loss component. For example, the object detector generator 140 may receive the leak score for each bounding box for a false detection, determine a loss component based on each leak score, and train the modified object detector 150 based on the loss components.

The process includes detecting an object using the modified object detector (250). For example, a new image with the camera view may be provided to the modified object detector 150 which may then draw a bounding box around a target object in the image.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   obtaining a foreground occupancy map for a camera view;
   determining an area of an image in which there is a false detection of an object;
   determining a likely contribution of the area to the false detection based on the foreground occupancy map;
   generating a modified object detector based on the likely contribution of the area comprising:
      increasing a loss component for a bounding box based on the likely contribution of the area; and
      training the modified object detector based on the loss component; and
   detecting an object using the modified object detector.

2. The method of claim 1, wherein obtaining a foreground occupancy map for a camera view comprises:
   determining a frequency that pixels within images from the camera view are included in a bounding box for images in a training dataset.

3. The method of claim 2, wherein each of the images in the training dataset includes a respective bounding box.

4. The method of claim 2, wherein the bounding box indicates that pixels within the bounding box include an object of interest.

5. The method of claim 1, wherein determining an area of an image in which there is a false detection of an object comprises:
   determining that a bounding box generated for the image does not include an object of interest.

6. The method of claim 5, wherein determining that a bounding box generated for the image does not include an object of interest comprises:
   providing the image to an object detector generated from images in a training dataset; and
   receiving, from the object detector, an indication of the bounding box.

7. The method of claim 1, wherein determining a likely contribution of the area to the false detection based on the foreground occupancy map comprises:
   determining values for pixels in the foreground occupancy map for the camera view that correspond to pixels in the bounding box; and
   determining the likely contribution of the area to the false detection based on the values for the pixels in the foreground occupancy map.

8. A system comprising:
   one or more computers and one or more storage devices storing instructions that are operable, when executed by the one or more computers, to cause the one or more computers to perform operations comprising:
   obtaining a foreground occupancy map for a camera view;
   determining an area of an image in which there is a false detection of an object;
   determining a likely contribution of the area to the false detection based on the foreground occupancy map;
   generating a modified object detector based on the likely contribution of the area, comprising:
      increasing a loss component for a bounding box based on the likely contribution of the area; and
      training the modified object detector based on the loss component; and
   detecting an object using the modified object detector.

9. The system of claim 8, wherein obtaining a foreground occupancy map for a camera view comprises:
   determining a frequency that pixels within images from the camera view are included in a bounding box for images in a training dataset.

10. The system of claim 9, wherein each of the images in the training dataset includes a respective bounding box.

11. The system of claim 9, wherein the bounding box indicates that pixels within the bounding box include an object of interest.

12. The system of claim 8, wherein determining an area of an image in which there is a false detection of an object comprises:
   determining that a bounding box generated for the image does not include an object of interest.

13. The system of claim 12, wherein determining that a bounding box generated for the image does not include an object of interest comprises:
   providing the image to an object detector generated from images in a training dataset; and
   receiving, from the object detector, an indication of the bounding box.

14. The system of claim 8, wherein determining a likely contribution of the area to the false detection based on the foreground occupancy map comprises:
   determining values for pixels in the foreground occupancy map for the camera view that correspond to pixels in the bounding box; and
   determining the likely contribution of the area to the false detection based on the values for the pixels in the foreground occupancy map.

15. A non-transitory computer-readable medium storing software comprising instructions executable by one or more computers which, upon such execution, cause the one or more computers to perform operations comprising:
   obtaining a foreground occupancy map for a camera view;
   determining an area of an image in which there is a false detection of an object;
   determining a likely contribution of the area to the false detection based on the foreground occupancy map;
   generating a modified object detector based on the likely contribution of the area comprising:
      increasing a loss component for a bounding box based on the likely contribution of the area; and training the modified object detector based on the loss component; and detecting an object using the modified object detector.

16. The medium of claim 15, wherein obtaining a foreground occupancy map for a camera view comprises:

determining a frequency that pixels within images from the camera view are included in a bounding box for images in a training dataset.

17. The medium of claim 16, wherein each of the images in the training dataset includes a respective bounding box.

18. The medium of claim 16, wherein the bounding box indicates that pixels within the bounding box include an object of interest.

19. The medium of claim 15, wherein determining an area of an image in which there is a false detection of an object comprises:

determining that a bounding box generated for the image does not include an object of interest.

20. The medium of claim 19, wherein determining that a bounding box generated for the image does not include an object of interest comprises:

providing the image to an object detector generated from images in a training dataset; and receiving, from the object detector, an indication of the bounding box.

* * * * *